United States Patent
Ballarin

(10) Patent No.: US 11,104,274 B2
(45) Date of Patent: Aug. 31, 2021

(54) MIRROR ASSEMBLIES FOR VEHICLES

(71) Applicant: Volvo Truck Corporation, Gothenburg (SE)

(72) Inventor: Paolo Ballarin, Saint Genis Laval (FR)

(73) Assignee: VOLVO TRUCK CORPORATION, Gothenburg (SE)

(*) Notice: Subject to any disclaimer, the term of this patent is extended or adjusted under 35 U.S.C. 154(b) by 179 days.

(21) Appl. No.: 16/468,541

(22) PCT Filed: Dec. 14, 2016

(86) PCT No.: PCT/IB2016/001971
§ 371 (c)(1),
(2) Date: Jun. 11, 2019

(87) PCT Pub. No.: WO2018/109517
PCT Pub. Date: Jun. 21, 2018

(65) Prior Publication Data
US 2020/0070728 A1    Mar. 5, 2020

(51) Int. Cl.
*G02B 7/182* (2021.01)
*B60R 1/06* (2006.01)

(52) U.S. Cl.
CPC ................ *B60R 1/0605* (2013.01)

(58) Field of Classification Search
CPC ....... B60R 1/0605; Y10T 24/4409; F16B 2/22
(Continued)

(56) References Cited

U.S. PATENT DOCUMENTS 7,614,755 B2 * 11/2009 Branham .............. B60R 1/06
                                                    24/456
2008/0259476 A1  10/2008 Branham
2014/0241792 A1   8/2014 Enz et al.

FOREIGN PATENT DOCUMENTS

JP          2014069782 A      4/2014

OTHER PUBLICATIONS

International Search Report and Written Opinion for International Patent Application No. PCT/IB2016/001971, dated Mar. 29, 2017, 13 pages.

* cited by examiner

*Primary Examiner* — Euncha P Cherry
(74) *Attorney, Agent, or Firm* — Withrow & Terranova PLLC

(57) ABSTRACT

The invention relates to a mirror assembly (1) for a vehicle, comprising a housing having a first housing portion (12); a second housing portion (14), which is removably connected to the first housing portion (12) to define a recess therebetween; and a mirror mounted within the housing. A flexible engagement member (30) is provided between the first housing portion (12) and the second housing portion, the flexible engagement member (30) extending along at least a portion of an interface (18) between the first and the second housing portions. The flexible engagement member (30) comprises a first member portion first member portion (40) which extends inside the housing recess and which is releasably connected to at least one portion of the housing, and an second member portion (32) which extends from first member portion (40) to at least an outer surface of the housing (10). The second member portion (32) also extends at the interface (18) between a portion of a peripheral wall of the first housing portion (12) and a portion of a peripheral wall of the second housing portion (14). An operator can apply a force to the second member portion (32) of the flexible engagement member (30) to at least partially deform and/or displace the first member portion (40).

13 Claims, 3 Drawing Sheets

(58) Field of Classification Search
USPC .......................................................... 359/871
See application file for complete search history.

MIRROR ASSEMBLIES FOR VEHICLES

This application is a 35 USC 371 national phase filing of International Application No. PCT/IB2016/001971, filed Dec. 14, 2016, the disclosure of which is incorporated herein by reference in its entirety.

TECHNICAL FIELD

The invention relates to mirror assemblies for vehicles.

The invention can be applied in vehicles, in particular heavy-duty such as trucks, buses and construction equipment. Although the invention will be described with respect to a lorry or truck, the invention is not restricted to these particular types of vehicle, but may also be used in other vehicles such as, for example, cars, vans and buses.

BACKGROUND

Vehicle mirror assemblies are generally formed of two housing components. Exterior vehicle mirror assemblies often include a seal provided around at least a part of interface between the two housing components. The seal improves the aerodynamic properties of the mirror assembly and reduces unwanted whistling noise when the vehicle is in motion.

When a mirror assembly is damaged, it generally has to be disassembled in order to replace or repair components, or to remove the assembly from the vehicle. External vehicle mirror assemblies are particularly susceptible to damage because of the risk of impact with other vehicle and surrounding objects. The external cover of the mirror assembly is particularly exposed to the risk of impact damage. The mirror assembly has to be disassembled to either repair or replace the cover, or to remove the whole assembly from the vehicle.

Known mirror assemblies are difficult to disassemble and cause several problems for operators. Manual effort and dexterity on the part of the user is generally required. With one common arrangement, the operator must first partially disassemble the housing components and then unscrew or remove fixings provided within the housing. The fixings are generally separate components, such as screws, which can easily be lost or damaged. Access to the fixings may be restricted, and an appropriate tool is required to loosen and/or remove the fixings. Further, heavy-duty vehicles, such as trucks, have mirror assemblies which are provided at elevated positions on the vehicle body. This means that maintenance work must be carried out at height which adds to the difficulty of the task and presents a potential risk for the operator.

Embodiments of the invention seek to provide mirror assemblies which overcome some or all of these problems.

SUMMARY

An object of the invention is to provide an improved mirror assembly which is easier to assemble and disassemble, allowing simplified installation and maintenance.

According to a first aspect, the invention provides a mirror assembly for a vehicle, comprising:
a housing having:
  a first housing portion;
  a second housing portion, which is removably connected to the first housing portion to define a recess therebetween;
  a mirror mounted within the housing; and
  a flexible engagement member provided between the first housing portion and the second housing portion, the flexible engagement member extending along at least a portion of an interface between the first and the second housing portions. The flexible engagement member comprises:
    a first member portion which extends inside the housing recess and which is coupled to both housing portions, wherein the coupling between the first member portion and at least one housing portion is releasable, and
    a second member portion which extends from first member portion to at least an outer surface of the housing, the second member portion also extends at the interface between a portion of a peripheral wall of the first housing portion and a portion of a peripheral wall of the second housing portion, such that an operator can apply a force to the second member portion to deform and/or displace the first member portion of the flexible engagement member in order to release the releasable coupling between the first member portion and the housing.

The second member portion of the flexible engagement member may be formed integrally with the first member portion of the flexible engagement member.

The flexible engagement member may be configured such that an operator can apply a force to the second member portion to cause the first member portion to at least partially deform and/or displace to release the releasable coupling between the first member portion and the housing. The second member portion may be configured such that it can be pushed or pulled by operator's fingers to cause the first member portion to at least partially deform or displace in order to release the releasable coupling between the first member portion and the housing. The second member portion may be configured as a release tab which can be gripped by an operator's hand and/or a tool.

The flexible engagement member may provide a seal along the interface between at least a portion of the interface between the first housing portion and the second housing portion. The flexible engagement member may be a sealing element.

The first housing portion may be configured to be coupled to a vehicle. The first housing portion may be configured to be coupled to the exterior of a vehicle body.

The housing may include a releasable connection arrangement between the first and second housing portions.

The first member portion of the flexible engagement member may be releasably coupled to an inner surface of either the first housing portion or the second housing portion.

The first member portion of the flexible engagement member may be releasably coupled to both an inner surface of the first housing portion and an inner surface of the second housing portion.

The first member portion of the flexible engagement member may be permanently secured to the other of first housing portion or the second housing portion.

The first member portion of the flexible engagement member may be secured to the other of first housing portion or the second housing portion in at least one location. The first member portion of the flexible engagement member may be permanently coupled to the other of first housing portion or the second housing portion. The flexible engagement member first member portion may be secured to one of the housing portions by any suitable fixing mechanism, such as gluing, welding, clamping or any suitable equivalents.

The first member portion of the flexible engagement member may include at least one engagement element configured to releasably engage with at least one corresponding engagement element on an inner surface of either the first housing portion or the second housing portion.

The flexible engagement member may have a length, defined as extending in a direction parallel to the surface of the housing. At least one engagement element may be provided at an upper end or a lower end of the first member portion of the flexible engagement member. At least one engagement element may be provided at both the upper and lower ends of the first member portion of the flexible engagement member. A plurality of engagement elements may be provided along the length of the first member portion.

Alternatively, the at least one engaging element may be provided on the inner surface of either the first housing portion or the second housing portion, and the corresponding engagement element may be provided on the first member portion of the flexible engagement member.

The or each engagement comprises a deformable protrusion. The or each corresponding engagement element may comprise a recess or cavity, configured to releasably hold the deformable protrusion.

The or each deformable protrusion may have a neck portion and an enlarged head portion. The recess may have a shape corresponding to that of the or each engagement portion. The recess may be a groove extending along the inner surface of the housing portion. A plurality of recesses may be provided at locations along the length to align with a plurality of deformable protrusions.

The or each engagement portion may comprise a hook, and the corresponding engagement element may comprise a complementary formation, such as a groove or tab, for releasably holding the hook. The engagement portion(s) and corresponding engagement elements may comprises any suitable releasable coupling arrangement.

The flexible engagement member may have a length which is defined as extending in a direction parallel to the surface of the housing. A plurality of engagement elements may be provided along the length of the flexible engagement member inner portion, except adjacent to the release tab. The engagement elements may be equally spaced along the flexible engagement member first member portion.

The second member portion of the flexible engagement member may extend outwardly from an outer surface of the housing.

The second member portion of the flexible engagement member may comprise at least one outwardly extending tab which extends outwardly from an outer surface of the housing.

The second member portion may extend substantially perpendicular to the surface of the housing. The second member portion may be provided with a gripping surface. The second member portion may be provided with a textured surface.

The second member portion of the flexible engagement member may comprise at least one outwardly extending tab.

A single tab may be provided a midpoint along the length of the flexible engagement member. A tab may be provided either side of a midpoint along the length of the flexible engagement member. A plurality of tabs may be provided along the length of the flexible engagement member.

The first member portion of the flexible engagement member may have a cross-sectional area which varies along its length. The cross-sectional area is preferably reduced in the portion aligned with the or each tab The first member portion may have a cross-sectional area which varies along its length. The first member portion may have a reduced cross-sectional area adjacent to the or each tab. The first member portion may have an increased cross-sectional area at its upper end and lower end.

The flexible engagement member may extend along at least a portion of one side of the housing.

The flexible engagement member may extend substantially along the whole of one side of the housing. The flexible engagement member may extend along a central portion of one side of the housing. The flexible engagement member may extend along a lower portion or an upper portion of one side of the housing. Preferably, the flexible engagement member extends along at least half of the periphery of the housing.

Two or more flexible engagement members are provided along the interface between the first and second housing portions. The flexible engagement members may be provided on the same side of the housing. The flexible engagement members may be provided on different sides of the housing.

The housing includes a recessed area along the interface between the first and second housing portions, the recessed area being configured such that when the mirror is assembled; at least a part of the first member portion of the flexible engagement member is located within the recessed area.

The or each flexible engagement member is made from a flexible material. The flexible engagement member may be made from an elastic material. The flexible engagement member may be made from rubber, soft polymer, or any similar elastic material.

According to a further aspect, the invention provides a vehicle comprising a mirror assembly as described above. The vehicle may be a truck, lorry, heavy duty vehicle, bus or similar According to a further aspect, the invention provides a method of assembling a mirror assembly for a vehicle comprising providing a first housing component;

providing a second housing component having a mirror mounted therein; the second housing portion being removably connected to the first housing portion to define a housing and a recess therebetween;

providing a flexible engagement member between the first housing portion and the second housing portion, such that it extends along at least a portion of an interface between the first and the second housing portions, the flexible engagement member having a first member portion which extends inside the housing recess and a second member portion which extends from first member portion to at least an outer surface of the housing, the second member portion also extends at the interface between a portion of a peripheral wall of the first housing portion and a portion of a peripheral wall of the second housing portion;

coupling the first member portion to the inner surface of one of the housing portion; and releasably coupling the first member portion to the inner surface of the other housing portion.

According to a further aspect, the invention provides a method of disassembling the mirror assembly as previously described comprising applying a force to the second member portion of the flexible engagement member such that the first member portion of the flexible engagement member deforms and/or displaces to release it from the other housing portion.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the following embodiments, the terms describing directions relate to the orientation when the mirror is assembled on a vehicle and during normal use. Therefore, the term "forward" or "front" refers to the front of the vehicle and "rear" to back end of the vehicle. Similarly, the term "lower" refers to the part closest to the ground and "upper" means distant or remote from the ground.

Figure 1:
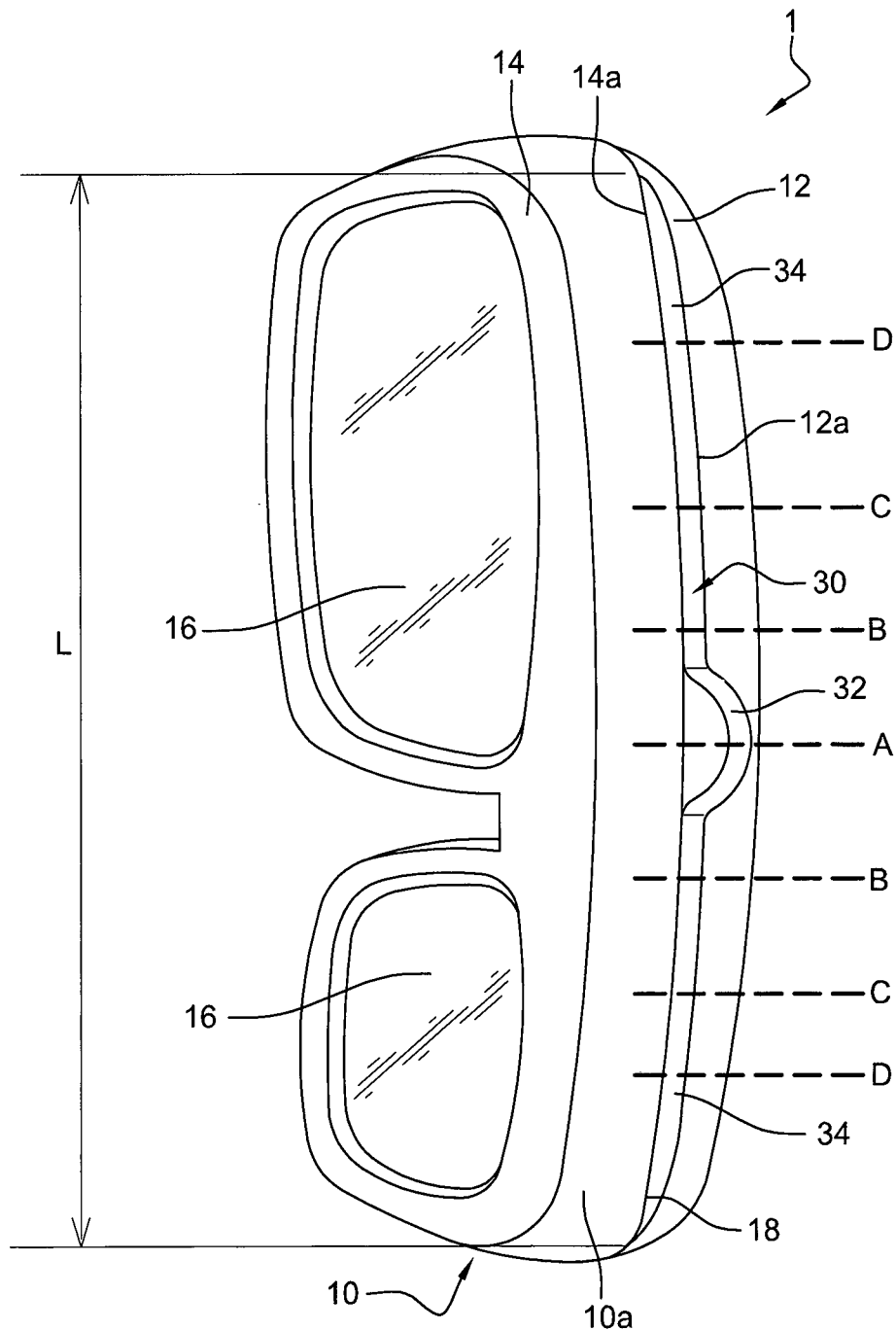
FIG. 1 is rear perspective view of a mirror assembly in accordance with a first embodiment of the invention.

FIG. 1 shows a mirror assembly 1 according to a first embodiment of the invention. The mirror assembly 1 includes a housing 10 comprising a first housing portion 12 and a second housing portion 14, mirrors 16 and a flexible engagement member 30. Although not shown in the figures, it will be appreciated that the mirror assembly 1 is mounted to the exterior of a vehicle body using any of the known fixing mechanisms or systems. The type of mirror assembly shown in this embodiment is mounted with a first side 10a of the housing facing the vehicle body. The embodiment shown is a rear view mirror, and it will be appreciated that the mirror assembly 1 is mounted with the mirrors facing towards the rear of the vehicle.

The first housing portion 12, which can also be referred to as a carrier, is removably connected to the second housing portion 14, which can also be referred to as a cover. The first housing portion 12 and second housing portion 14 have opposing edges 12a and 14a formed by peripheral walls of first housing portion 12 and the second housing portion 14 which are aligned when the housing is assembled to form an interface 18 between the two housing portions. A recess 20 (shown schematically in for example in FIG. 2a) is formed between the two housing components. In this embodiment, the two mirrors 16 are mounted within the cover 14.

The flexible engagement member 30 is made from a flexible material. The flexible engagement member 30 is located along the interface between the first and second housing portions on one side of the mirror assembly. In the embodiment of FIG. 1, the flexible engagement member 30 includes an external portion or release tab 32, also referred to as a second member portion 32, which protrudes outwardly from an outer surface of side 10a of the housing 10. The flexible engagement member 30 has a length L. The release tab 32 is provided centrally along the length L. The flexible engagement member 30 includes sections 34 which extend in a direction parallel to the interface 18 between the housing portions 12, 14. The sections 34 extend either side of the release tab 32 substantially along the side 10a of the housing 10. In the embodiment of FIG. 1, the edge 12a of first housing portion 12 has a modified edge profile along side 10a with a profile corresponding to that of the flexible engagement member 30.

The outer surfaces of sections 34 are substantially flush with the surface of the housing 10 (FIGS. 1 and 2b), and since the flexible engagement member 30 is made from a flexible material this minimises gaps along the interface 18. This ensures that aerodynamic whistling is reduced.

Figure 2A:
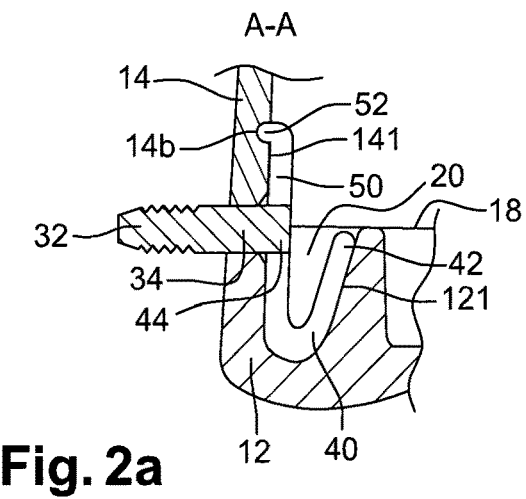
FIG. 2a is a partial sectional view through line A of FIG. 1 of the mirror assembly in an assembled state.
Figure 2B:
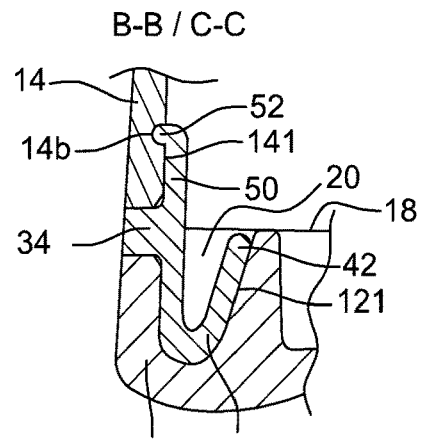
FIG. 2b is a partial sectional view through line B or C of FIG. 1 of the mirror assembly in an mounted state.
Figure 2C:
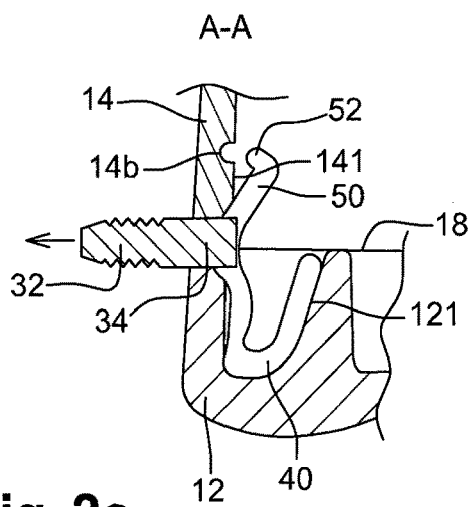
FIG. 2c is a partial sectional view through line A of FIG. 1 of the mirror assembly according to a disassembling step of a first method.
Figure 2D:
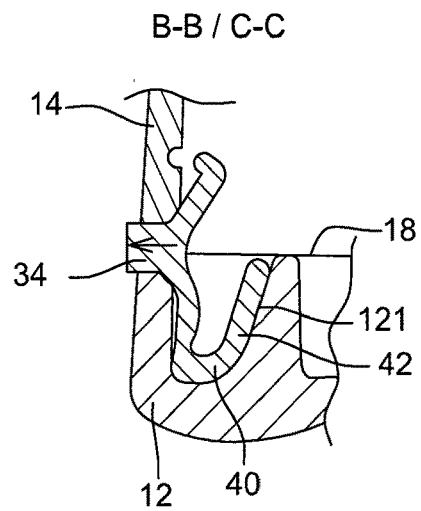
FIG. 2d is a partial sectional view through line B or C of FIG. 1; of the mirror assembly according to a disassembling step of the first method.

As shown in FIGS. 2a to 2f the flexible engagement member 30 also includes an inner portion 40 that is integrally formed with the release tab 32 and which extends within the recess 20. The inner portion 40 is also referred to as a first member portion 40. The cross-sectional area and eventually the shape of the inner portion of flexible engagement member 30 varies along its length L. The inner portion 40 of the flexible engagement member 30 has preferably a minimum cross-sectional area at its upper and lower ends. FIGS. 2c and 2d shows a rear section 42 which is permanently secured to an inner surface 121 of the first housing portion 12 and a forward section 50 which is releasably connected to the second housing portion 14. The forward section 50 has protrusions 52 which locate within a groove 14b on the inner surface 141 of the second housing portion 14 (shown in FIGS. 2c and 2d).

The inner portion 40 has preferably a minimum cross-sectional area at the midpoint along the length L (FIG. 2a). In the area adjacent to and immediately to each side of the release tab 32 (FIGS. 2a and 2b) the central inner portion 44 of the inner portion 40, that extends into the recess 20 is preferably not connected to the inner surfaces 121, 141 of the housing 10.

To assemble the mirror assembly 1, the flexible engagement member 30 is aligned with corresponding profile of the first housing portion edge 12a. The flexible engagement member 30 is secured, via its rear section 42, to the first housing portion 12 at least at upper and lower ends by gluing, welding or another suitable permanent fixing method. The second housing portion 14 is then secured to the flexible engagement member 30 by locating the protrusions 52 in the groove 14b and then pushing them into engagement. When the housing is assembled, the opposing edges of the first and second housing portions grip the flexible engagement member 30.

Such as represented on FIGS. 2c and 2d, to disassemble the mirror assembly 1, an operator can grip the release tab 32 and exerts a force in a direction perpendicular to the interface between the housing portions, i.e. the operator can pull the tab 32 forwards or backwards (see FIG. 2c). As the release tab 32 is urged out of its neutral position, the sections 34 and the inner portion 40 deform and the forward sections 50 are pulled away from the inner surface 141 of the second housing portion 14 (see FIG. 2d). This causes the protrusions 52 to disengage from the groove 14b. Since the flexible engagement member 30 is secured to the first housing portion 12, the second housing portion 14 can now be removed, leaving the first housing portion 12 connected to the flexible engagement member 30.

Figure 2E:
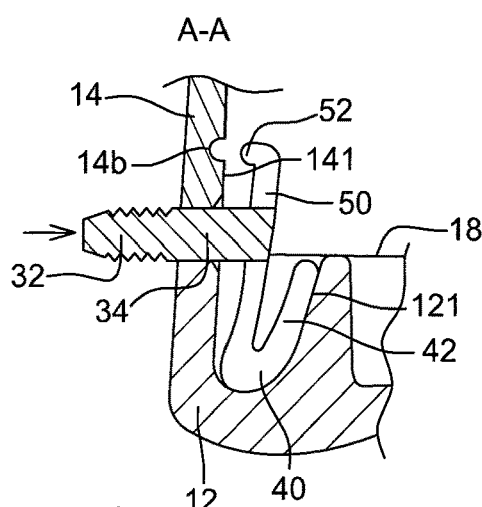
FIG. 2e is a partial sectional view through line A of FIG. 1 of the mirror assembly according to a disassembling step of a second method.
Figure 2F:
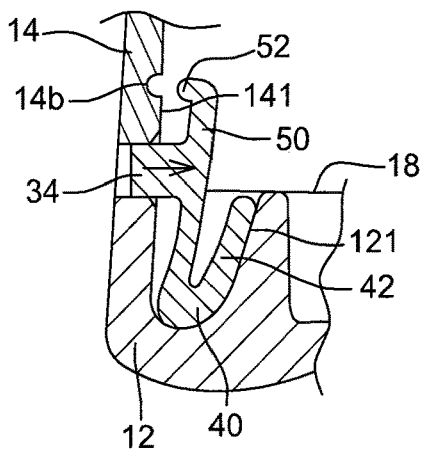
FIG. 2f is a partial sectional view through line B or C of FIG. 1; of the mirror assembly according to a disassembling step of the second method.

Alternatively and such as represented on FIGS. 2e and 2f, the operator can push the second member portion 32 towards the inside of the housing 10 (see FIG. 2e) to urge it out of its neutral position that causes a deformation of the sections 34 and of the inner portion 40 and then causes the forward sections 50 to be pulled away from the inner surface 141 of the second housing portion 14 (see FIG. 2f). According to the latter alternative, the second member portion 32 can be designed specifically to receive a pushing force from operator.

The mirror assembly 1 can be provided with at least two flexible engagement members 30 arranged on opposite sides 10a of the housing 10. In the latter case, the dissembling method requests to disengage both flexible engagement members.

In a variant, the mirror assembly 1 can be provided with at least one flexible engagement members 30 arranged on at least one side 10a of the housing 10. On at least the opposite side(s) of the housing 10 that devoid of flexible engagement member, the first housing portion 12 and the second housing portion 14 are attached together by means, for instance, of mounting clips or of engaging male/female corresponding shaped connections. In this latter case, the disengagement of the flexible engagement member 30 make easier, in a next step, the disengagement of the second housing portion 14 from the first housing portion 12 as regards the other side(s) of the housing 10 that are devoid of flexible engagement member.

The operator can disassemble the mirror assembly simply and easily without the need for tools, and without causing damage to the housing components. However, it will also be appreciated that any suitable gripping tool can be used on the release tab.

Figure 3:
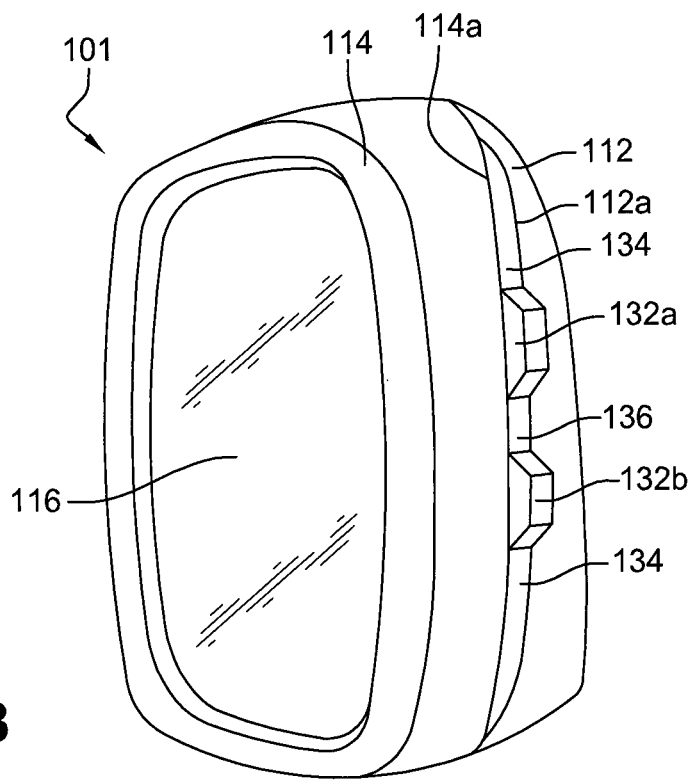
FIG. 3 is a perspective view of a mirror assembly in accordance with a second embodiment of the invention.

FIG. 3 shows a mirror assembly 101 according to a second embodiment of the invention. The mirror assembly 101 includes a housing 110 comprising carrier 112, a cover 114, a mirror 116 and a flexible engagement member 130. As with the earlier embodiment, mating edges 112a and 114a are aligned along an interface 118 between the two housing portions 112, 114, and a recess (not shown) is formed between the two housing components. In this embodiment, a single mirror 116 is mounted within the cover 114. The second member portion of the flexible engagement member includes two release tabs 132a and 132b which are provided above and below a central section 136 which is flush with the housing surface. Two extensions 134 extend above and below the tabs 132a, 132b.

The first member portion (not shown) is, for instance, permanently secured to the cover 114, and releasably secured to the carrier 112. It will be appreciated that, as with the earlier embodiment, the central section of inner portion which is horizontally aligned with the tabs is preferably not connected to the inner surfaces of the housing.

The second embodiment can be assembled and disassembled in a similar way to the first embodiment, by an operator who, for instance, pulls the tabs forwards or backwards to release the inner portion from the carrier 112.

Figure 4:
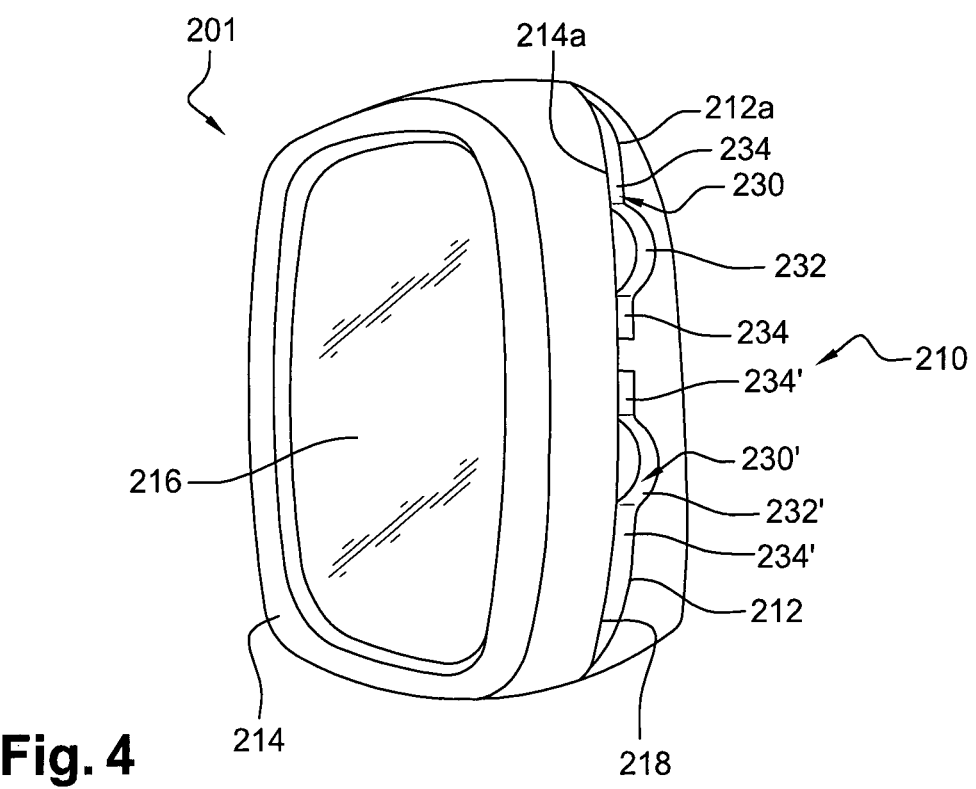
FIG. 4 is a perspective view of a mirror assembly in accordance with a third embodiment of the invention.

FIG. 4 shows a mirror assembly 201 according to a third embodiment of the invention. The mirror assembly 201 includes a housing 210 comprising carrier 212, a cover 214, and a mirror 216. In this embodiment, an upper flexible engagement member 230 and a lower flexible engagement member 230' are provided. In the embodiment of FIG. 4, the edge 212a of first housing portion 212 has a modified edge profile along side 210a with a profile having recesses corresponding to the two smaller flexible engagement members 230, 230'. The inner portions of the flexible engagement members (not shown) can be fixed to the housing as described in either of the previous embodiments, i.e. releasably coupled to one of the carrier or the cover and permanently fixed to the other of the carrier or the cover.

The third embodiment can be assembled and disassembled as described above.

Although the embodiments above are described with the flexible engagement member secured to one housing portion and releasably coupled to another housing portion, it will be appreciated that the flexible engagement member could be releasably coupled to both housing portions.

In modified embodiments (not shown), the housing is modified to provide a recess in which the release tab(s) is at least partially located when the mirror assembly is assembled. In this arrangement, since the tab does not protrude as far from the housing surface or does not protrude at all, the aerodynamic drag is reduced and whistling reduced.

In modified embodiments (not shown), the release tab(s) are provided with a textured gripping surface. The gripping surface makes it easier for an operator to hold the tab either with their hands or a tool.

In further modified embodiments (not shown), the or each release tabs are positioned and shaped so as to guide rain water away from the mirror surface.

Whilst the invention has been described in relation to a mirror assembly having two housing components, it will be appreciated that the invention can be applied to mirror assemblies having more that two housing components, and that flexible engagement members as described above, can be provided in the interface between some or all adjacent housing components in order to allow adjacent housing components to be easily assembled and disassembled.

Although the invention has been described in relation to an exterior vehicle mirror assembly, it will be appreciated that the invention can be applied to internal vehicle mirror assemblies, and indeed any other mirror assembly having at least two housing portions.

It is to be understood that the present invention is not limited to the embodiments described above and illustrated in the drawings; rather, the skilled person will recognize that many changes and modifications may be made within the scope of the appended claims.

The invention claimed is:

1. A mirror assembly for a vehicle, comprising
 a housing having
  a first housing portion;
  a second housing portion, which is removably connected to the first housing portion to define a recess therebetween;
  a mirror mounted within the housing; and
  a flexible engagement member being a sealing element providing a seal along the interface between the first housing portion and the second housing portion provided between the first housing portion and the second housing portion, the flexible engagement member extending along at least a portion of an interface between the first and the second housing portions;
 wherein the flexible engagement member comprises:
  an internal portion which extends inside the housing recess and which is coupled to both housing portions, wherein the coupling between the internal portion and at least one housing portion is releasable, and a release tab which extends outside the housing, such that an operator can apply a force to the release tab to release the releasable coupling between the internal portion and the housing.

2. The mirror assembly according to claim 1, wherein the internal portion of the flexible engagement member is releasably coupled to an inner surface of either the first housing portion or the second housing portion.

3. The mirror assembly according to claim 2, wherein the internal portion of the flexible engagement member is permanently secured to the other of first housing portion or the second housing portion.

4. The mirror assembly according to claim 1, wherein the internal portion of the flexible engagement member includes at least one engagement element configured to releasably engage with at least one corresponding engagement element on an inner surface of either the first housing portion or the second housing portion.

5. The mirror assembly according to claim 4, wherein the or each engagement element comprises a deformable protrusion and the or each corresponding engagement element comprises a recess configured to releasably hold the deformable protrusion.

6. The mirror assembly according to claim 4, wherein the flexible engagement member has a length L which is defined as extending in a direction parallel to the surface of the housing and a plurality of engagement elements are provided along the flexible engagement member internal portion.

7. The mirror assembly according to claim 1, wherein the release tab of the flexible engagement member comprises at least one outwardly extending tab which extends outwardly from an outer surface of the housing.

8. The mirror assembly according claim 6, wherein the internal portion of the flexible engagement member has a cross-sectional area which varies along its length L, wherein the cross-sectional area is reduced in the portion aligned with the or each release tab.

9. The mirror assembly according to claim 1, wherein the flexible engagement member extends along at least a portion of one side of the housing.

10. The mirror assembly according to claim 1, wherein two or more flexible engagement members are provided along the interface between the first and second housing portions.

11. The mirror assembly according to claim 1, wherein the housing includes a recessed area along the interface between the first and second housing portions, the recessed area being configured such that when the mirror is assembled, at least a part of the release tab of the flexible engagement member is located within the recessed area.

12. The mirror assembly according to claim 1, wherein the or each flexible engagement member is made from a flexible material.

13. A method comprising:
in order to assemble a mirror assembly for a vehicle:
    providing a first housing portion;
    providing a second housing portion having a mirror mounted therein; the second housing portion being removably connected to the first housing portion to define a housing recess therebetween;
    providing a flexible engagement member being a sealing element providing a seal along the interface between the first housing portion and the second housing portion, such that the flexible engagement member extends along at least a portion of an interface between the first and the second housing portions, the flexible engagement member having an internal portion which extends inside the housing recess and a release tab which extends outwardly from the housing surface;
    coupling the flexible engagement member internal portion to the inner surface of one of the housing portions; and
    releasably coupling the flexible engagement member internal portion to the inner surface of the other housing portion.

* * * * *